United States Patent
Sachtleben

(10) Patent No.: US 7,069,837 B2
(45) Date of Patent: Jul. 4, 2006

(54) PORTION PACKAGE AND APPARATUS FOR MAKING AN AROMATIC BEVERAGE

(75) Inventor: Andreas Sachtleben, Minden (DE)

(73) Assignee: Melitta Haushaltsprodukte GmbH & Co. KG, Minden (DE)

( * ) Notice: Subject to any disclaimer, the term of this patent is extended or adjusted under 35 U.S.C. 154(b) by 171 days.

(21) Appl. No.: 10/702,473

(22) Filed: Nov. 7, 2003

(65) Prior Publication Data

US 2004/0094040 A1    May 20, 2004

(30) Foreign Application Priority Data

Nov. 8, 2002    (DE) ............................ 202 17 411 U

(51) Int. Cl.
    B65D 85/804    (2006.01)
    A47J 31/00    (2006.01)
(52) U.S. Cl. .................. 99/295; 99/289 R; 426/77
(58) Field of Classification Search .................. 99/295, 99/289 R, 302 R; 426/77, 112, 433
    See application file for complete search history.

(56) References Cited

U.S. PATENT DOCUMENTS

| | | | | |
|---|---|---|---|---|
| 4,853,234 A | * | 8/1989 | Bentley et al. ............... | 426/77 |
| 5,327,815 A | * | 7/1994 | Fond et al. .................... | 99/295 |
| 5,424,083 A | * | 6/1995 | Lozito .......................... | 426/82 |
| 6,644,173 B1 | * | 11/2003 | Lazaris et al. ................ | 99/295 |
| 6,857,352 B1 | * | 2/2005 | Fischer ........................ | 99/280 |
| 6,869,627 B1 | * | 3/2005 | Perkovic et al. ............. | 426/77 |

FOREIGN PATENT DOCUMENTS

| | | |
|---|---|---|
| DE | 1 903 458 | 10/1964 |
| DE | 1 207 866 | 12/1965 |
| DE | 1 293 977 | 4/1969 |
| DE | 84 00 488 | 12/1989 |
| DE | 697 03 235 | 2/2001 |
| DE | 201 00 166 | 5/2001 |

* cited by examiner

Primary Examiner—Reginald L. Alexander
(74) Attorney, Agent, or Firm—Venable LLP; Robert Kinberg; Steven J. Schwarz

(57) ABSTRACT

A portion package for making an aromatic beverage includes a dish-shaped lower part having a bottom presenting a bottom surface, and a circumferential side wall extending from the bottom and including an outwardly extending edge at an upper end thereof. The lower part comprises a material having filtering capabilities. The circumferential side wall includes at least two oppositely located side walls converging in a wedge-shaped manner. The edge extends parallel to the bottom surface. A lid lies on the edge of the lower part and is bonded thereto.

10 Claims, 5 Drawing Sheets

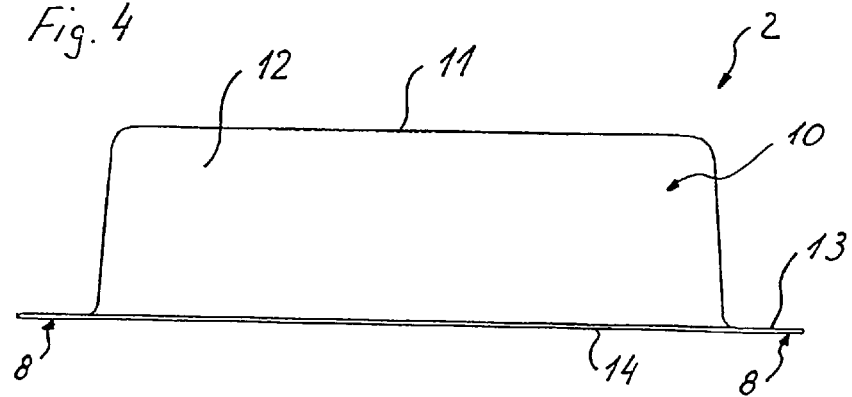
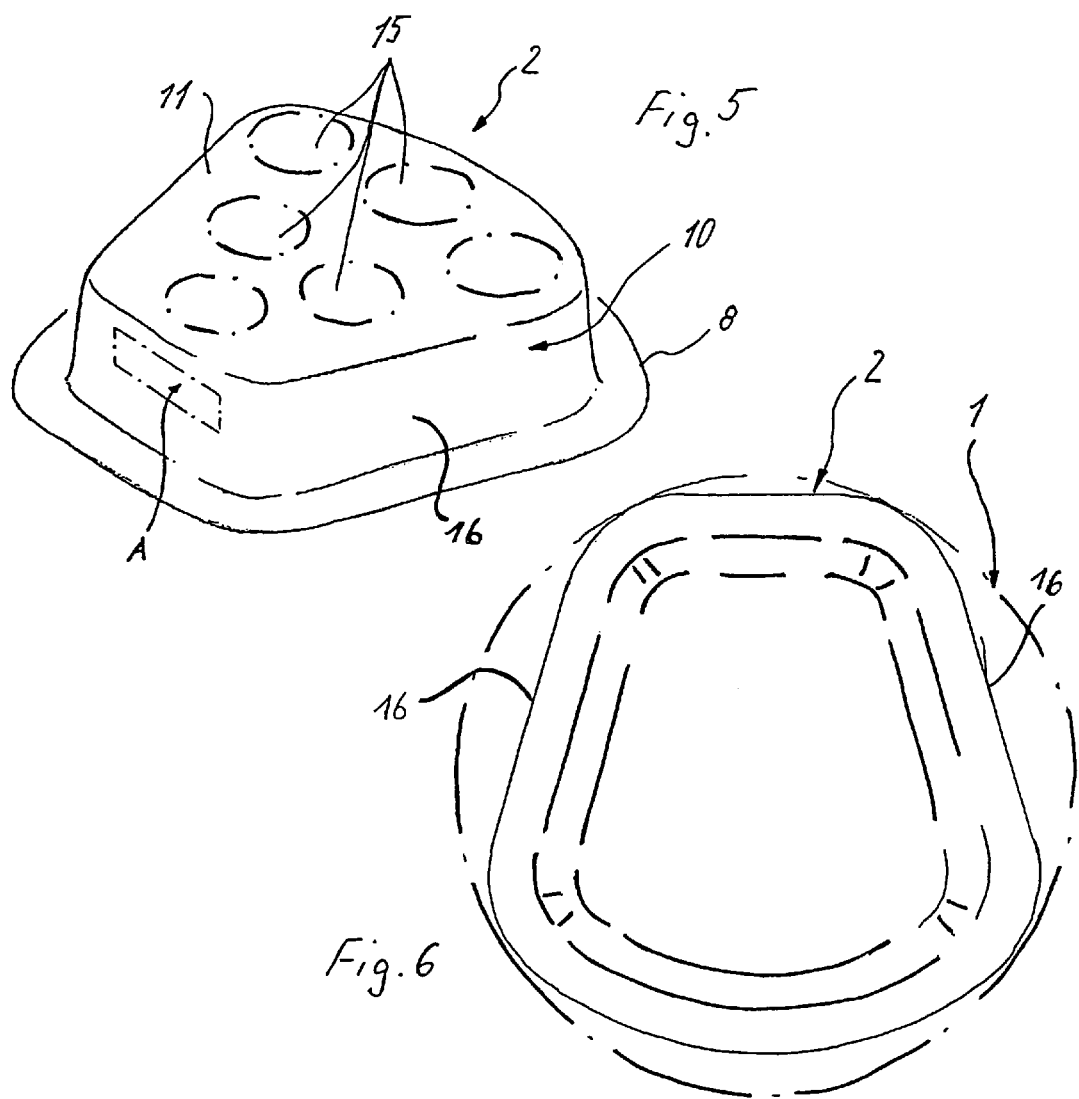

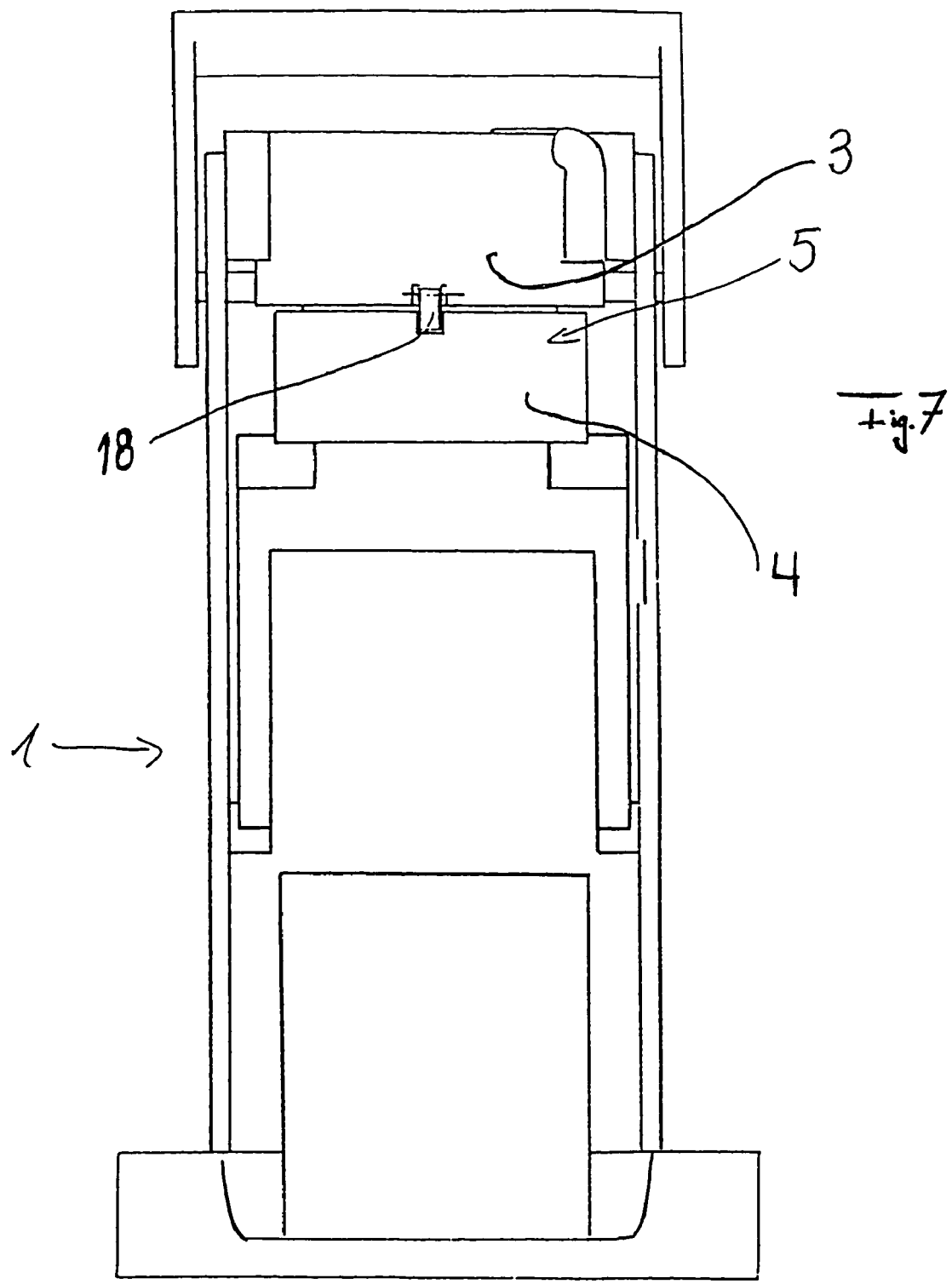

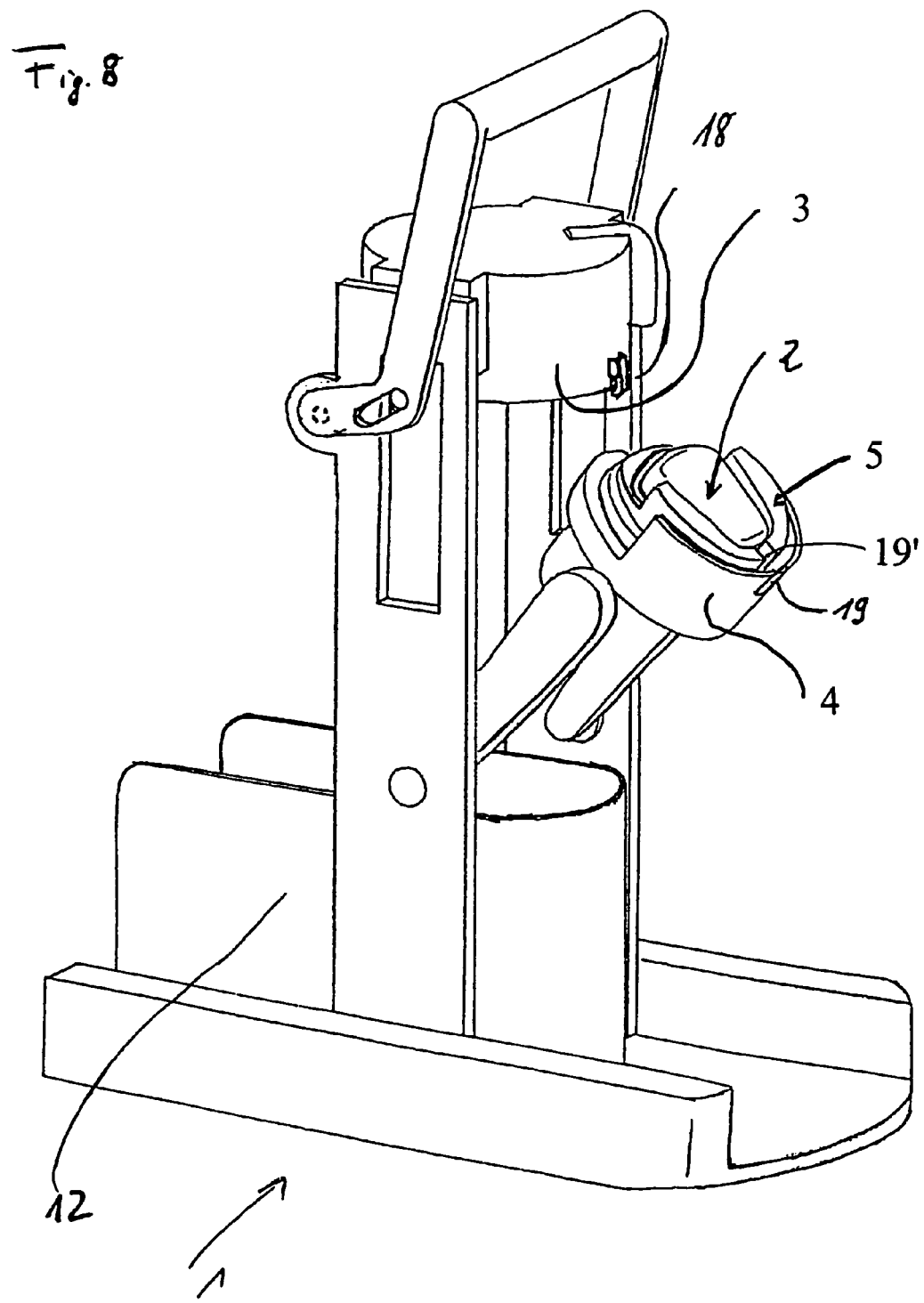

PORTION PACKAGE AND APPARATUS FOR MAKING AN AROMATIC BEVERAGE

CROSS-REFERENCE TO RELATED APPLICATION

Priority is claimed herein with respect to German Application No. 202 17 411.5 filed on Nov. 8, 2002, the subject matter of which is incorporated herein by reference.

BACKGROUND OF THE INVENTION

The invention relates to a portion package for an aromatic beverage, for example coffee, in which the portion package has a dish-shaped lower part provided with a bottom and a circumferential side wall having an outwardly extending edge at the upper end thereof, the edge extending parallel to the surface of the bottom, and a lid lying on the edge of the lower part bonded thereto, wherein at least the lower part is made of a material having filtering capabilities.

The invention also relates an apparatus for a portioned making of an aromatic beverage, for example coffee, having a brewing chamber for receiving a portion package filled with an aromatic carrier, the brewing chamber being formed of a stationary part and a receiving part for the portion package, the receiving part being movable relative to the stationary part between an open position and a closed position, wherein after insertion of a portion package and after closing the receiving part, the portion package is sealed on all sides with for the exception of an inlet for hot water for extracting the aromatic carrier and an outlet for the aromatic beverage.

Apparatuses of the above-outlined type as well as portion packages for use therewith have been known in numerous embodiments and enjoy an ever-increasing popularity since, on the one hand, the number of "single households" for which such apparatuses are particularly intended, is increasing and, independently therefrom, on the other hand, the use of such apparatuses is also welcome in multi-person households for a rapid, unproblematic making of only a single portion of an aromatic beverage, particularly coffee.

Basically, such an apparatus may be manipulated in a relatively simple manner. For the purpose of inserting a portion package, the brewing chamber is opened from its closed position, a portion package is placed into the brewing chamber, the brewing chamber is closed and then a switch is actuated for initiating the brewing process.

Subsequent to the brewing of an aromatic beverage, the portion package, containing the used-up aromatic carrier, may be removed.

To obtain an optimal brewing result, it is important that the portion package be centered in the brewing chamber so that the brewing water is guided possibly without losses through the aromatic carrier within the portion package. Such a result, however, is not always achieved due, on the one hand, to the construction of the known apparatuses and, on the other and, to the portion packages used heretofore.

In many instances particular attention is required of the user with respect to a careful insertion of the portion package into the brewing chamber. In the absence of such are the portion package may not be inserted in an exactly centered manner into the brewing chamber. As a result, a part of the brewing water may run through the brewing chamber while circumventing the aromatic carrier to a certain extent and therefore such water portion does not participate in the extraction process, thus yielding a beverage of poor quality.

SUMMARY OF THE INVENTION

It is an object of the present invention to provide a portion package and an apparatus of the above-mentioned type which consistently ensure an optimal brewing result with an extremely simple manipulation. Further, the portion package should excel by virtue of its unproblematic handling, on the one hand, and a suitable stability, on the other hand, just as it should excel by virtue of the possibility of its relatively economical manufacture.

The above and other objects are achieved according to one aspect of the invention by the provision of a portion package for making an aromatic beverage, comprising: a dish-shaped lower part having a bottom presenting a bottom surface, and a circumferential side wall extending from the bottom and including an outwardly extending edge at an upper end thereof, the lower part comprising a material having filtering capabilities, the circumferential side wall including at least two oppositely located side walls converging in a wedge-shaped manner, and the edge extending parallel to the bottom surface; and a lid lying on the edge of the lower part and being bonded thereto.

A portion package according to the invention is, by virtue of its wedge shape, ideally adapted for an accurately fitting insertion into a predetermined position in a brewing chamber of the apparatus according to the invention as described below, It is to be understood that the wedge shape of the portion package is adapted to the geometric configuration of the brewing chamber.

By virtue of a compression of the side wall, the entire portion package obtains a relatively high stability which is additionally increased by the circumferential, outwardly extending edge. The latter, together with the superposed lid portion, and the bond also form a reinforced and stiffened region of the portion package. As a result, the portion package may be well manipulated and, due to the earlier-described configuration of the brewing chamber, may be, as it were, automatically centered by a definite and reliable insertion into the inserter of the brewing chamber during closing of the latter.

A compression of the side wall of the portion package to render it water tight to the greatest degree also eliminates the danger that during the brewing process brewing water can take a flow path other than through the aromatic carrier situated in the portion package.

The necessary and desired consequence of the above-outlined configuration is a consistently and uniformly good brewing result.

The portion package is expediently flattened in its frontal, tapered region, that is, the wedge-shaped portion package does not terminate in a point. The flattening may be of such a size that a relatively large surface is obtained for a handle of a stripper or ejector. In case of a correspondingly large contacting surface between the portion package, on the one hand, and a stripper or ejector, on the other hand, a high surface pressure is avoided to thus ensure a mechanical ejection of the portion package without the danger of its destruction.

The lower part and/or the lid are/is preferably made from a mass-producible, non-woven plastic or a plastic/paper mixture, both having filtering capabilities.

According to a further aspect of the invention, there is provided an apparatus for a portioned making of an aromatic beverage from a portion package filled with an aromatic carrier, the portion package including a circumferential side wall having a wedge shape and a tapered frontal region, the apparatus comprising: a brewing chamber for receiving the portion package, the brewing chamber comprising a stationary part and a receiving part for receiving the portion package, the receiving part being movable relative to the stationary part between an open position and a closed position, wherein in the closed position of the receiving part, a portion package inserted in the receiving part is sealable on all sides with the exception of an inlet for hot water for extracting the aromatic carrier and an outlet for the aromatic beverage, the receiving part including a wedge-shaped inserter for receiving the tapered, frontal region of the wedge-shape portion package, the stationary part having an end region opposite the inserter presenting an abutment so that when the portion package is inserted, the inserted portion package is immobilized when the brewing receiving part is in the closed position.

The configuration of the brewing chamber of an apparatus according to the invention, having the above-discussed features, ensures that in the closed state of the brewing chamber a portion package always assumes an accurately centered position even if the user, when placing the portion package in the receiving part, does not exercise the required care. This is so, because upon closing the brewing chamber the wedge-shaped portion package is, by virtue of the configuration of the brewing chamber, shifted into its predetermined position without any assistance from the user. Such a position is ensured by the wedge shape of the brewing chamber, on the one hand, and the wedge shape of the portion package, on the other hand.

Since the receiving part is provided with an inserter and also has an undercut for a projecting frontal edge region of the portion package, the portion package is, upon opening the brewing chamber after the brewing of an aromatic beverage, firmly held in the inserter and thus the portion package cannot adhere to the stationary part of the brewing chamber by adhesion forces. As a result, malfunctioning during the removal of the used portion package is avoided.

The stationary part of the brewing chamber may be advantageously provided with a device for stripping or brushing away a used portion package upon opening the brewing chamber.

As noted above, an adherence of the used portion package to the stationary or fixed part of the brewing chamber is securely prevented, so that an automatic ejection of the used portion package by the ejector may be consistently effected in an unproblematic, disturbance-free manner.

An embodiment of the invention is illustrated in the accompanying drawings and will be described in further detail.

BRIEF DESCRIPTION OF THE DRAWINGS

FIG. 4 is a side view of a portion package according to the invention for use in a brewing chamber according to FIGS. 1–3.

FIG. 5 is a perspective illustration of the portion package shown in FIG. 4.

FIG. 6 is a top view of the portion package shown in FIGS. 4 and 5, together with a symbolic indication of the base surface of a brewing chamber.

FIG. 8 is a front view of a portion of an apparatus according to the invention for making an aromatic beverage.

FIG. 7 is a perspective view of the apparatus of FIG. 7, having an opened brewing chamber.

DETAILED DESCRIPTION OF THE INVENTION

Figure 1:
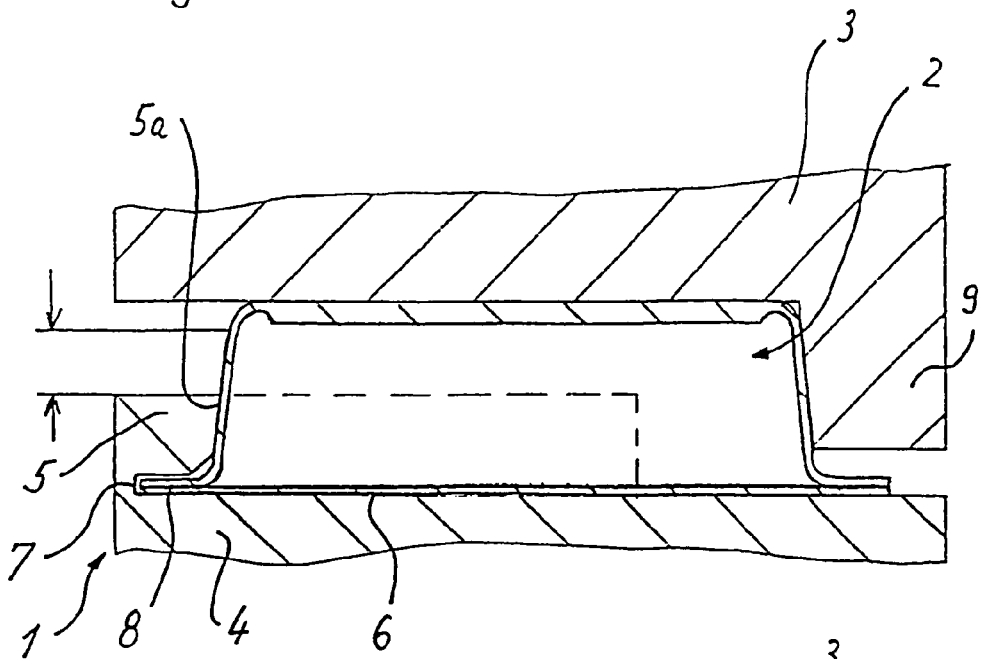
FIG. 1 in a schematically illustrated section taken trough a closed brewing chamber receiving a portion package and forming part of the apparatus according to the invention.
Figure 2:
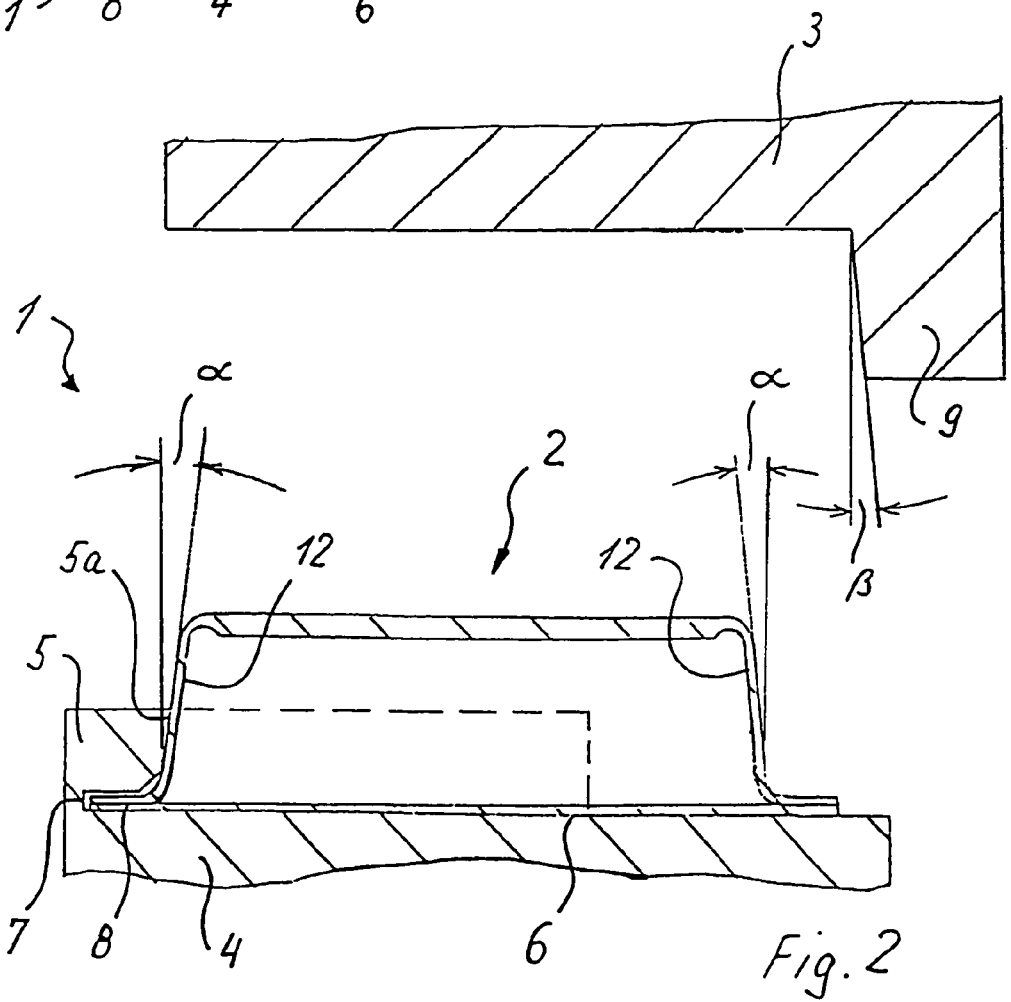
FIG. 2 is a section corresponding to that of FIG. 1 and taken through the opened brewing chamber.
Figure 3:
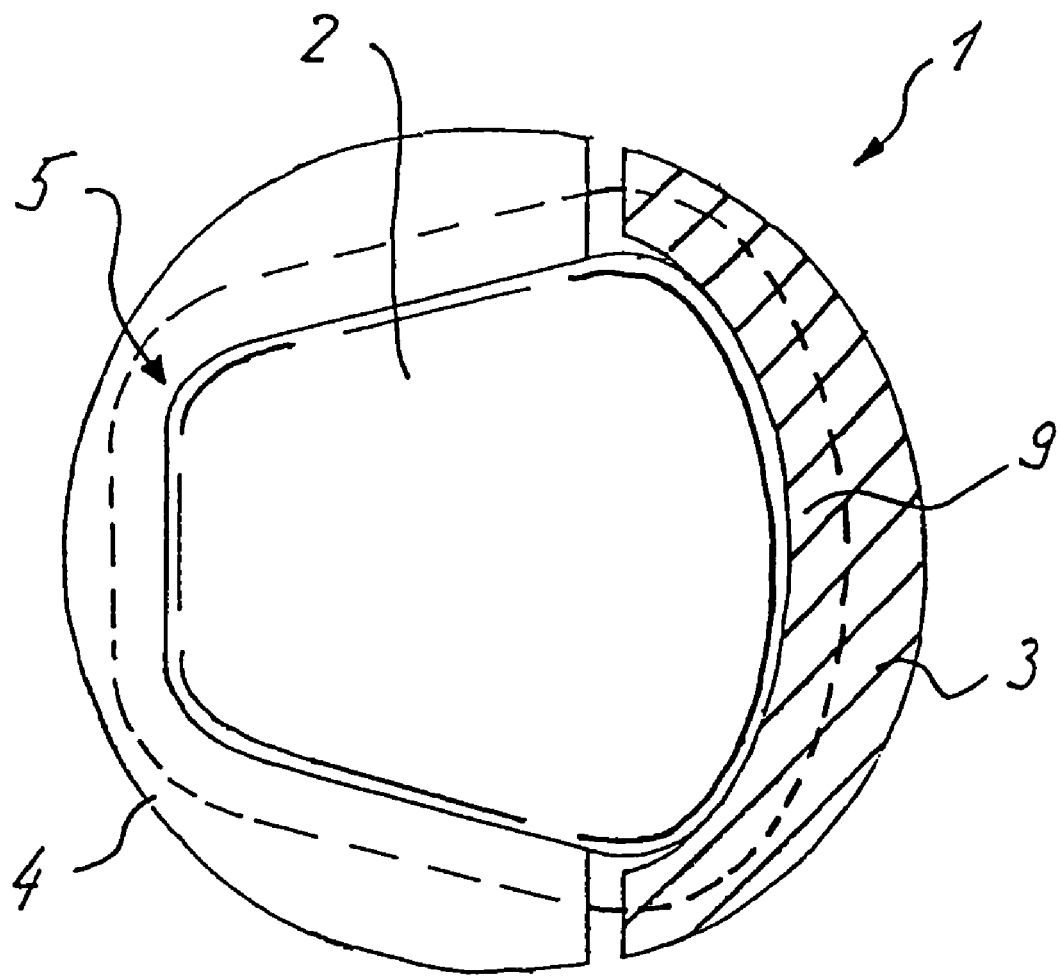
FIG. 3 is a horizontal section taken through the brewing chamber according to FIGS. 1 and 2.

Referring to FIGS. 1–3, there is shown in schematic manner, a brewing chamber in an otherwise not illustrated apparatus for the portioned making of an aromatic beverage, for example coffee.

The making of the aromatic beverage occurs with the use of a portion package 2 which is placed into a brewing chamber 1 provided for this purpose.

Since in conjunction with the present invention only the configuration of the brewing chamber 1 and that of the portion package 2 are of interest, an illustration of details of the apparatus for making the aromatic beverage has been dispensed with.

The brewing chamber 1 is essentially formed of a stationary part 3 and a receiving part 4 which is movable with aspect to the stationary part 3 and which serves for a substantially form-fitting accommodation of the portion package 2.

In the illustrated embodiment the movable receiving part 4 is displaceable, for example rotatable, or shiftable, relative to the stationary part 3, from a closed position shown in FIG. 1 into an open position shown in FIG. 2.

In the open position according to FIG. 2 a portion package 2 may be comfortably placed into the receiving part 4. After insertion of the portion package 2 into the receiving part 4, the latter is moved back into its closed position, whereupon the brewing chamber 1 is sealed in a desired manner on all sides with the exception of a water inlet for the intake of brewing water and an outlet for the prepared aromatic beverage.

An illustration of the above-noted inlet for hot water and the outlet for the aromatic beverage has been dispensed with.

It is of essence in conjunction with the present invention that the receiving part 4 has a wedge-shaped inserter 5 for the portion package 2 which has a likewise wedge-shaped outline, that the inserter is provided in the supporting region 6 of the brewing chamber 1 with an undercut 7 for covering a projecting edge a of the portion package 2 and that the stationary part 3 of the brewing chamber 1 is provided with an abutment 9 at its end region opposite the inserter 5. By means of the abutment 9 the portion package 2 is immobilized in a predetermined end position within the brewing chamber 1 in the closed position thereof.

FIGS. 1 and 3 show that the portion package 2 is placed the supporting region 6 of the receiving part 4 and may b introduced with its circumferential edge 8 partially into the undercut 7 of the inserter 5 already at this stage of operation. Such an operation will be evidently significantly facilitated by the wedge shape of the inserter 5 as well as by the wedge shape of the portion package 2. Upon closing of the brewing chamber 1 by an appropriate displacement of the receiving part 4, the portion package 2 is brought into contact with the abutment 9 of the stationary part 3 of the brewing chamber 1 and may be further pressed into the inserter 5. Stated differently, it is not necessary that the user be concerned with an absolutely correct seating of the portion package 2 within the brewing chamber 1. Such a result is automatically achieved practically upon closing of the brewing chamber 1 by the fact that the abutment 9 always moves the portion package 2 into a predetermined position within the brewing chamber 1. In this manner the portion package 2 is always perfectly centered within the brewing chamber 1. It is noted that in the present context by "centering" there is meant a circumstance in which the portion package 2 always assumes an optimal position for the brewing process.

Such a result is of importance, since care has to be taken that the hot water entering the brewing chamber 1 is practically forced to pass exclusively through the portion package 2 and thus does not partially flow around the outer sides thereof.

Further, the undercut 7 of the receiving part 4 ensures that the portion package 2 cannot adhere to the stationary part 3, but is always detached therefrom upon opening the brewing chamber 1, because as noted earlier, the portion package 2 is immobilized by the receiving part 4, or, more precisely, by the inserter 5 thereof.

FIGS. 4–6 show the above described portion package 2 in several views.

The portion package 2 is essentially formed of a dish-shaped lower part 10 having a bottom 11, a circumferential side wall 12 having at its upper end an outwardly projecting edge 13 extending parallel to the bottom surface, and a lid 14 which, after filling the dish-shaped lower part 10 with an aromatic carrier, is positioned on the edge 13 and bonded thereto. The portion package 2 has two wedge-shaped converging side walls 16 which lend the portion package a wedge-shaped outline.

The lower part 10 of the portion package 2 is made preferably by a deep-drawing process from a non-woven plastic or a plastic/paper mixture, both having filtering capabilities. The region of the side wall 12 is compressed to make it water tight to a significant degree. Such a compression of the side wall 12, on the one hand, contributes substantially to the stabilization of the overall portion package 2 and, on the other hand, ensures that no brewing water may exit through the side wall 12 in an undesired manner.

The lid 14 is also advantageously made from a non-woven plastic or a plastic/paper mixture, having filtering capabilities. The bonding of the lid 14 to the edge 13 of the lower part 10 may be advantageously effected by sealing.

The superposed material layers of the edge 13 and the lid 14 form the edge 8 (see FIGS. 1 and 2) which projects into the undercut 7 of the receiving part 4.

As may be observed particularly in FIGS. 1 and 2, the circumferential side wall 12 of the portion package 2, starting from the lid 14, conically tapers at an angle α.

The corresponding supporting region 5a of the receiving part 4 is accordingly chamfered, so that the portion package 2 is additionally fixed in the receiving part 4.

The abutment 9 of the stationary part 3 of the brewing chamber 1 is provided with a corresponding chamfer having an angle β, so that the abutment 9 too, arrives into a full-arc a contact with the facing side wall 12 of the portion package 2.

The regions of the portion package 2 compressed to different degrees, particularly by virtue of the substantial compression of the side wall 12 and a compression of the edge 8, lend the portion package 2 a stability which significantly improves the handling, packing and transporting of the portion package 2 and which, as noted earlier, contribute to a very secure and stable seating of the portion package 2 within the brewing chamber 1.

Overall, the brewing chamber 1 and the portion package 2 are matched in an optimal manner, so that the user of the apparatus according to the invention, when utilizing a portion package 2 of the invention, does not have to exercise an increased care for achieving an optimal result.

As shown in FIG. 5, in the region of the flattened narrow side of the portion package 2 a relatively large surface A is provided for being engaged by a stripper or the like. By virtue of such a surface a relatively low specific surface pressure is obtained during stripping or ejecting the portion package 2. A destruction of the portion package 2 during ejection is thus securely prevented.

As further shown in FIG. 5, the bottom 11 of the portion package 2 may be provided with regions 15 whose water permeability is higher than the other regions of the bottom 11. Such a result may be obtained during manufacture of the lower part 10 by providing for different degrees of compression of material in the region of the bottom 11. The same considerations may apply to the lid 14. In case the portion package 2 is provided with particularly water-permeable regions 15, the latter should be expediently arranged so that they directly face the water inlet openings in the brewing chamber 1. In this manner a deliberate, uniform saturation of the aromatic carrier within the portion package 2 is ensured to a significant degree.

FIGS. 7 and 8 show an apparatus for making an aromatic beverage, having a brewing chamber 1 into which a portion package 2 may be inserted. The apparatus comprises a receiving part 4 and a wedge-shaped inserter 5 for the portion package 2 whose outline is also wedge-shaped. The inserter 5 is movable relative to the receiving part 4. The inserter 5 is provided with a C-shaped seating region 6 which surrounds the portion package 2 and which has an undercut 7 for covering a projecting edge a of the portion package 2. Upon closing the brewing chamber 1, the portion package 2 is pressed against a rearward abutment 9 which moves the portion package 2 into a predetermined position within the brewing chamber 1. The portion package 2 is thus received within the brewing chamber 1 in a centered, form-fitting manner.

For removing a used portion package 2, a downward projecting stripper 18 is provided on the stationary part 3. Upon moving the inserter 5 in an outward direction, a web portion of the stripper 18 penetrates through a slot 19 provided in a side wall receiving part 4 and a slot 19' of the inserter 5 and pushes against a package side wall facing the slot 19 and 19' until the portion package 2 is displaced from the seating region 6 and drops down or is guided to a removal station. Other mechanisms may be used for removing the portion package 2 from the seating region.

In the described embodiment a dished lower paart 10 and a lid 14 are provided. It is evidently also possible to "invert" the portion package to thus provide a dished upper part and a planar bottom.

The invention has been described in detail with respect to preferred embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A portion package for making an aromatic beverage, comprising:
   a dish-shaped lower part having a bottom presenting a bottom surface, and a circumferential side wall extending from the bottom and including an outwardly extending edge at an upper end thereof, the lower part comprising a material having filtering capabilities, the circumferential side wall including a front wall, a rear wall, and two oppositely located, non-parallel side walls extending substantially between the front wall and the rear wall, the non-parallel side walls converging in a wedge-shaped manner, and the edge extending parallel to the bottom surface; and a lid lying on the edge of the lower part and being bonded thereto.

2. The portion package according to claim 1, wherein a region of the side wall of the lower part is compressed to be substantially impervious to water.

3. The portion package according to claim 2, wherein the edge together with a region of the lid lying on the edge is compressed approximately to the same degree as the circumferential side wall to be substantially impervious to water.

4. The portion package according to claim 1, wherein at least one of the lid and the lower part comprises one of a non-woven plastic and a plastic/paper mixture each of which have filtering capabilities.

5. The portion package according to claim 1, wherein the lid is bonded to the edge by a sealing process.

6. The portion package according to claim 1, wherein at least one of the bottom of the lower part and the lid includes regions having a water permeability that is greater than a water permeability of portions of the bottom and the lid, respectively, which lie externally of the regions.

7. The portion package according to claim 6, wherein the portions of the bottom and the lid, respectively, are compressed relative to the regions.

8. The portion package according to claim 1, wherein the circumferential side wall of the lower part tapers at an angle a from the lid in the direction of the bottom.

9. An apparatus for a portioned making of an aromatic beverage from a portion package filled with an aromatic carrier, the portion package including a circumferential side wall having a wedge shape and a tapered frontal region, the apparatus comprising:

a brewing chamber for receiving the portion package, the brewing chamber comprising a stationary part and a receiving part for receiving the portion package, the receiving part being movable relative to the stationary part between an open position and a closed position, wherein in the closed position of the receiving part, a portion package inserted in the receiving part is sealable on all sides with the exception of an inlet for hot water for extracting the aromatic carrier and an outlet for the aromatic beverage, the receiving part including a wedge-shaped inserter for receiving the tapered, frontal region of the wedge-shape portion package, the stationary part having an end region opposite the inserter, the end region including an abutment adapted to engage the portion package, wherein the wedge-shaped inserter and the abutment cooperate to position the portion package in a predetermined position within the brewing chamber when the receiving part is in the closed position.

10. The apparatus according to claim 9, wherein the portion package has a projecting edge region, and the inserter includes a supporting region for the portion package and an undercut in the supporting region for covering the projecting edge region of the portion package when the portion package is inserted in the receiving part.

* * * * *